(12) United States Patent
Choi et al.

(10) Patent No.: US 7,069,570 B2
(45) Date of Patent: Jun. 27, 2006

(54) DISK CARTRIDGE WITH DISK CLEANING STRUCTURE

(75) Inventors: Un-jin Choi, Seoul (KR); Soon-kyo Hong, Seoul (KR); Byoung-young Bae, Pyeongtak-si (KR); Sung-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 09/884,421

(22) Filed: Jun. 20, 2001

(65) Prior Publication Data
US 2002/0114267 A1   Aug. 22, 2002

(30) Foreign Application Priority Data
Feb. 22, 2001   (KR) ................... 2001-8997

(51) Int. Cl.
*G11B 23/03* (2006.01)
(52) U.S. Cl. ........................... 720/725; 360/133
(58) Field of Classification Search ............... 369/291, 369/291.1; 360/133, 97.02, 97.04; 720/725
See application file for complete search history.

(56) References Cited

U.S. PATENT DOCUMENTS

| | | | | |
|---|---|---|---|---|
| 3,839,734 A | | 10/1974 | George et al. ............ | 360/97.02 |
| 3,893,185 A | | 7/1975 | Ring et al. .................. | 360/234 |
| 4,626,949 A | * | 12/1986 | Brock et al. ................ | 360/133 |
| 4,648,002 A | * | 3/1987 | Mroz et al. ................. | 360/137 |
| 4,843,511 A | * | 6/1989 | Downey ...................... | 360/133 |
| 4,885,652 A | * | 12/1989 | Leonard et al. ............. | 360/133 |
| 4,918,559 A | * | 4/1990 | Maruyama et al. ......... | 360/133 |
| 5,006,948 A | | 4/1991 | Fukunaga et al. .......... | 360/133 |
| 5,422,775 A | * | 6/1995 | Martin ........................ | 360/133 |
| 5,537,281 A | * | 7/1996 | Ma et al. .................... | 360/133 |
| 5,687,048 A | * | 11/1997 | Mizuta ....................... | 360/133 |
| 5,812,351 A | * | 9/1998 | Wulfing et al. ............. | 360/133 |
| 5,850,327 A | * | 12/1998 | Mizuta ....................... | 360/133 |
| 5,969,917 A | * | 10/1999 | Iwaki ......................... | 360/133 |
| 5,980,791 A | * | 11/1999 | Berscheid et al. .......... | 264/40.1 |
| 6,295,182 B1 | * | 9/2001 | Yeo et al. ................... | 360/133 |

FOREIGN PATENT DOCUMENTS

| | | |
|---|---|---|
| EP | 0 351 178 | 1/1990 |
| EP | 01 033 716 | 9/2000 |
| JP | 04-159676 | 6/1992 |
| KR | 2000-9758 | 2/2000 |

OTHER PUBLICATIONS

English language Abstract of Japanese Patent Application No. 2-284980, filed Oct. 1990.

(Continued)

*Primary Examiner*—Angel Castro
(74) *Attorney, Agent, or Firm*—Stein, McEwen & Bui, LLP

(57) ABSTRACT

A disk cartridge and a disk recording and/or reproduction apparatus including a protrusion group which is made up of a plurality of protrusions and formed within a case housing a disk or within a housing in which a disk is loaded. Accordingly, the protrusions induce the flow of air generated during the rotation of the disk to serve as a force generated by variations in flow velocity and pressure. Therefore, foreign materials can be effectively removed from the surface of the disk using the flow of air without a separate cleaning apparatus.

14 Claims, 12 Drawing Sheets

OTHER PUBLICATIONS

English language Abstract of Japanese Patent Application No. 63-317735, filed Dec. 1988.

English language Abstract of Japanese Patent Application No. 1-216541, filed Aug. 1989.

* cited by examiner

------- PRESSURE PROFILE
——— AIR FLOW
—·—· FLOW VELOCITY PROFILE

→ FORCE DUE TO WIND
---→ FORCE DUE TO VARIATION IN PRESSURE

DISK CARTRIDGE WITH DISK CLEANING STRUCTURE

CROSS REFERENCE TO RELATED APPLICATIONS

This application claims the benefit of Korean Patent Application No. 01-8997 filed on Feb. 22, 2001 in the Korean Industrial Property Office, the disclosure of which is incorporated herein by reference.

BACKGROUND OF THE INVENTION

1. Field of the Invention

The present invention relates to a disk cartridge and a disk recording/reproducing apparatus, and more particularly, to a disk cartridge and a disk recording/reproducing apparatus which are designed to effectively remove foreign materials from the surface of a disk.

2. Description of the Related Art

As shown in FIG. 1, a typical disk cartridge 1 for housing a disk 2, such as an optical disk or a magnetic disk, has a shutter 3 slidably installed at one side of the disk cartridge, such that a disk recording/reproducing apparatus can record data to and reproduce data from the disk 2 by accessing the disk using its header (not shown) while selectively opening or closing the shutter 3.

However, since it is common that no protective layers are formed on the disk 2 housed in the disk cartridge 1, a foreign material such as fine dust attached on the surface of the disk 2 is very likely to cause serious errors during recording and reproduction of information to and from the disk. Also, in the case of a disk that is not housed in a cartridge and has a protective layer formed on the disk, a foreign material attached on the surface of the disk is very likely to cause errors during recording and reproduction of information to and from the disk. However, particularly, the disk 2, which is housed in the cartridge 1 without protective layers, has a greater possibility of errors being generated due to attachment of a foreign material to the surface of the disk 2.

In order to reduce the possibility of generating errors in the conventional art, a cleaning apparatus, as shown in FIGS. 1 through 3, is installed in the cartridge 1 to remove a foreign material from the surface of the disk 2. The cleaning apparatus includes a support arm 4 rotatably installed in the cartridge 1, a cleaning member 5 installed in the support arm 4 to contact the surface of the disk 2, and a lever 6 protruding outside the cartridge 1 so that a user may rotate the support arm 4. Thus, upon cleaning, as shown in FIGS. 1 and 3, the support arm 4 is rotated over the disk 2 so that the cleaning member 5 contacts the disk 2 while it rotates, thus removing a foreign material from the surface of the disk 2. Upon recording/reproducing, as shown in FIG. 2, the support arm 4 is then rotated in the opposite direction so that the cleaning member 5 does not disturb the disk 2.

However, in the above-described disk cartridge, a separate cleaning apparatus, as described above, must be installed in the cartridge 1 so that the number of component parts increases, and also the thickness of the cartridge 1 must be increased. Thus, the conventional disk cartridge is disadvantageous for the purpose of condensing a disk recording/reproducing apparatus. Also, in the case of disks having no protective layers formed thereon, the conventional disk cartridge can cause serious errors to the disk 2 when the cleaning member 5 directly contacts the surface of the disk 2.

Therefore, a disk cartridge capable of removing foreign materials from the surface of a disk in a non-contact manner, while protecting the surface of the disk, is required.

SUMMARY OF THE INVENTION

Accordingly, it is an object of the present invention to provide an improved disk cartridge and an improved disk recording/reproducing apparatus to remove foreign materials from the surface of a disk using the flow of air during disk rotation.

Additional objects and advantages of the invention wick be set forth in part in the description which foll owes and, in part, wick be obvious from the description, or may be learned by practice of the invention.

The foregoing objects of the present invention are achieved by providing a disk cartridge including a case housing an information recording/reproducing disk and a shutter which is installed within the case and secretively opened and closed to accomplish an access of the disk to a recording/reproducing apparatus, wherein a protrusion group having a pugnacity of protrusions, each protruding toward the disk, is formed on the inner wall of at least one of the case and the shutter.

The above objects of the present invention may also be achieved by providing a disk cartridge including a case housing an information recording/reproducing disk and a shutter which is installed within the case and secretively opened and closed to accomplish an access to the disk by a recording/reproducing apparatus, wherein a protrusion group, having a pugnacity of protrusions each protruding toward the disk, is rotatably formed within the case so that the protrusions are located over and under the disk or escaped from the region over and under the disk.

The above objects of the present invention may also be achieved by providing a disk cartridge including a case housing an information recording/reproducing disk and a shutter which is installed on the case and secretively opened and closed to accomplish access to the disk by a recording/reproducing apparatus, wherein a protrusion group having a pugnacity of protrusions, each protruding toward the disk, is formed within the case so as to ascend or descend, such that the protrusions approach the disk or are isolated from the disk.

The above objects of the present invention may also be achieved by providing a disk recording/reproducing apparatus recording information on or reproducing information from a disk while rotating the disk loaded within a housing, wherein a protrusion group, having a pugnacity of protrusions each protruding toward the disk, is rotatably formed within the housing so that the protrusions are located over and under the disk or escaped from the region over and under the disk.

The above objects of the present invention may also be achieved by providing a disk recording/reproducing apparatus recording information on or reproducing information from a disk while rotating the disk loaded within a housing, wherein a protrusion group having a pugnacity of protrusions, each protruding toward the disk, is formed within the house so as to ascend or descend, such that the protrusions approach to the disk or are isolated from the disk.

BRIEF DESCRIPTION OF THE DRAWINGS

The These and other objects and advantages of the present invention wick become apparent and more readily appreciated from the fooling description of the embodiments, taken in conjunction with the accompanying drawings of which.

DESCRIPTION OF THE PREFERRED EMBODIMENTS

Figure 1:
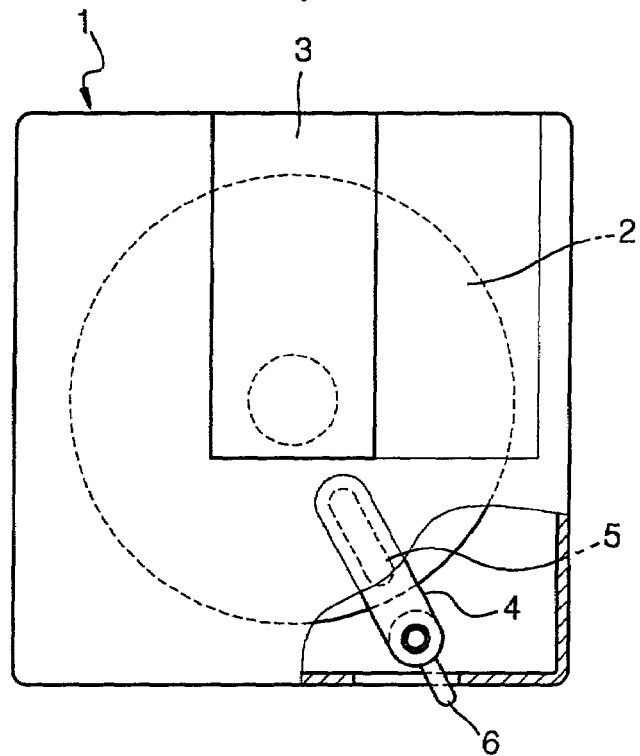
FIGS. 1 through 3 are plan views of a conventional disk cartridge including a separate disk cleaning apparatus.
Figure 2:
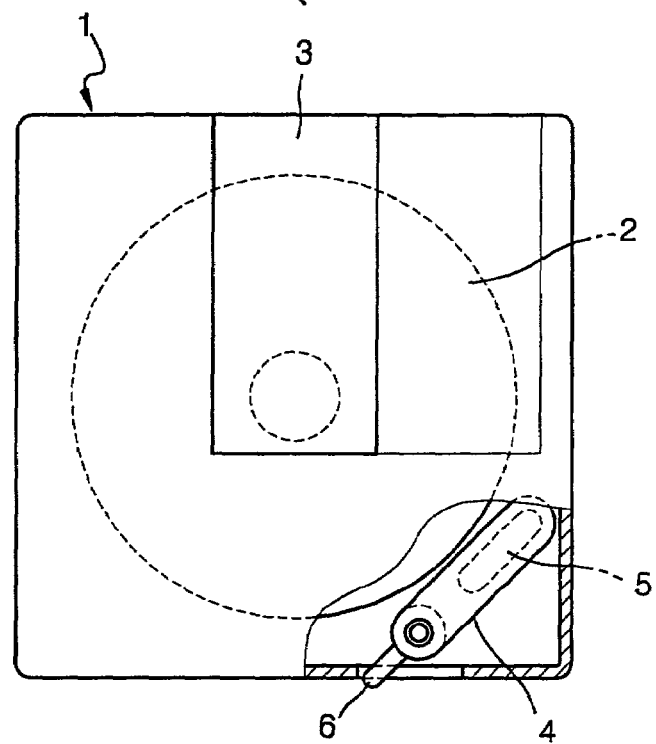
Figure 3:
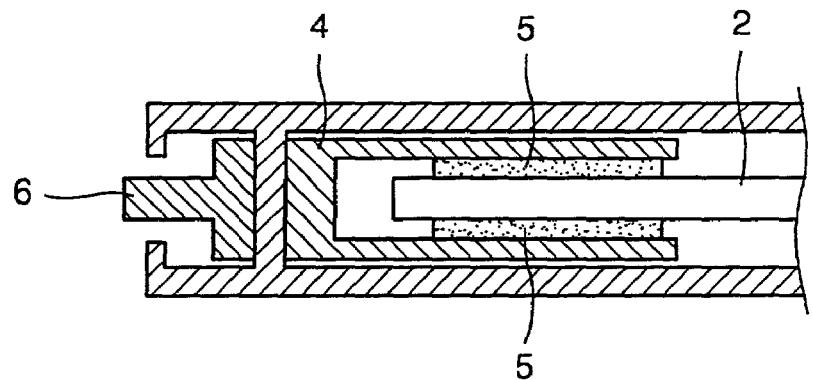

Reference wick now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
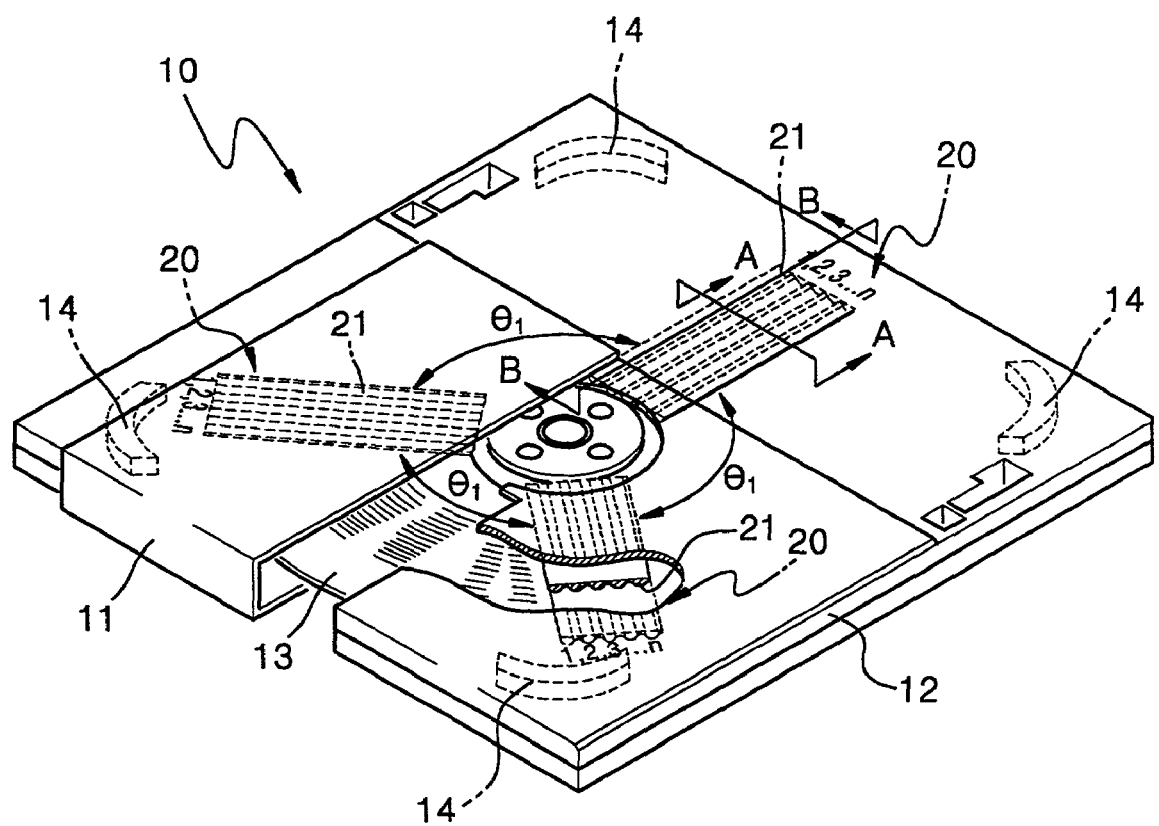
FIG. 4 is a perspective view of a disk cartridge according to an embodiment of the present invention.

Referring to FIG. 4, a disk cartridge 10 according to an embodiment of the present invention includes a case 12 housing a disk 13, a shutter 11 installed on the case 12 so that it is opened and closed to accomplish access to the disk 13 by a recording/reproducing apparatus, and foreign material filters 14. A protrusion group 20 having a pugnacity of protrusions 21 (first, second, third, ..., and n-th protrusions) protruding toward the disk 13 is formed on the inner Wac of the case 12 or on the inner Wac of the shutter 11. As shown in FIGS. 4 and 5B, the protrusions 21 linearly stretch in the radial direction of the disk 13, and the protrusion group 20 having the protrusions 21 is disposed at a pugnacity of places at an equiangular interval in the direction of rotation of the disk 13. The protrusion group 20 induces the flow of air caused during the rotation of the disk 13 to serve as a force to remove foreign materials from the surface of the disk 13. The protrusion group 20 is formed on each of the opposing upper and lower was of the case 12 to apply a force to each of the upper and lower surfaces of the disk 13. The protrusion group 20 can be incorporated into the inner Wac of the case 12 or shutter 11. Alternatively, the protrusion group 20 is separately manufactured and then coupled to the inner Wac of the case 12 or shutter 11 by an attachment process.

Figure 5A:
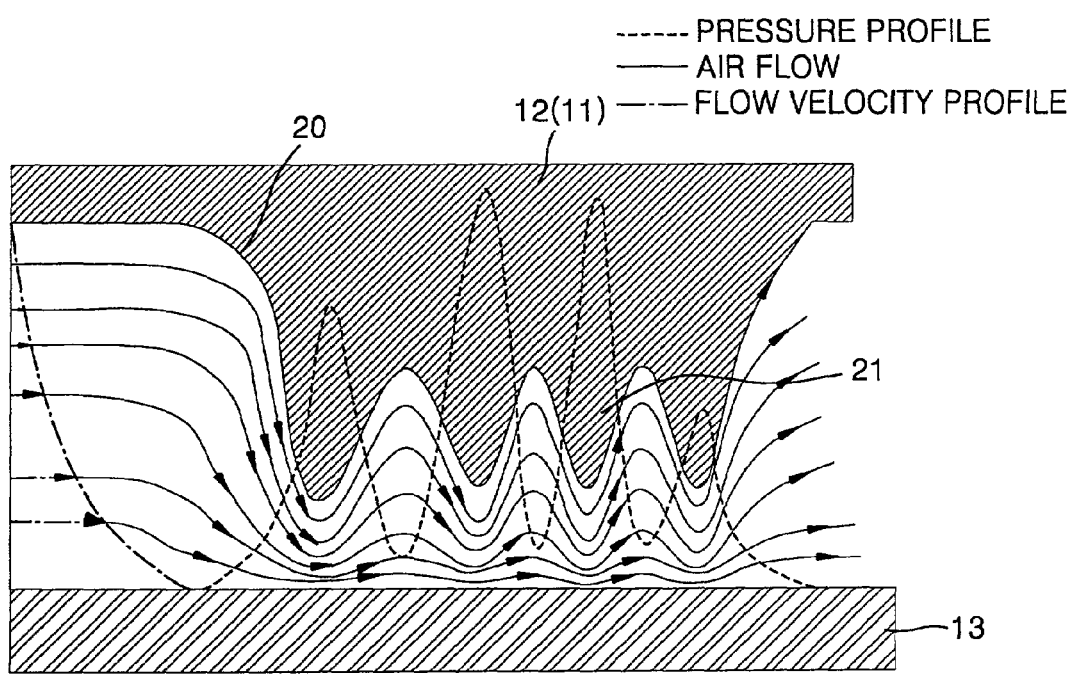
FIGS. 5A and 6 are cross-sections of the disk cartridge of FIG. 4 taken long line A—A, illustrating the effects that flowing of air during disk rotation under the structure of a protrusion group exerts on the surface of a disk.
Figure 5B:
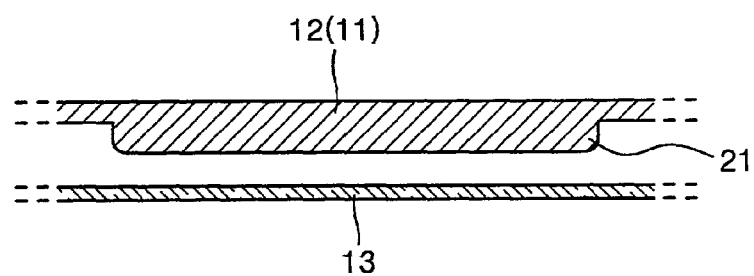
FIG. 5B is a cross-section of the disk cartridge of FIG. 4 taken along line B—B.
Figure 6:
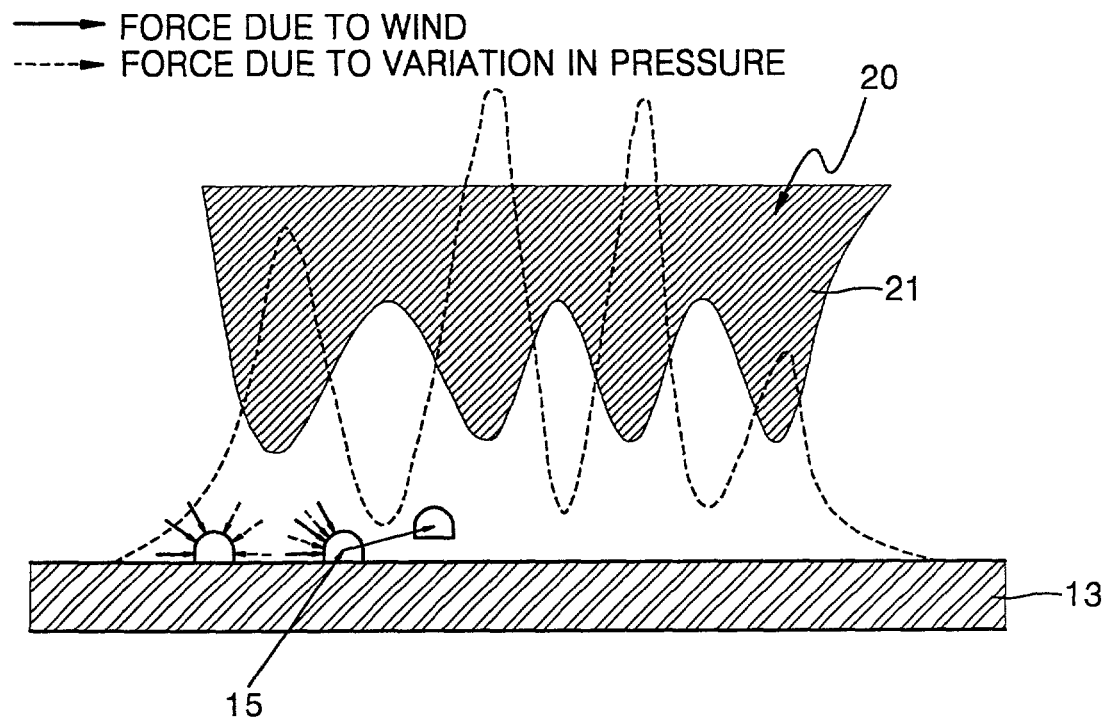

FIGS. 5A and 6 are cross-sections of the disk cartridge of FIG. 4 taken a long line A—A, which theoretically illustrate the principle that flowing of air caused during the rotation of the disk 13 exerts a predetermined force on the surface of the disk by the protrusions 21.

Referring to FIG. 5A, air generated by the rotation of the disk 13 repeats compression and expansion while passing between the protrusions 21 of the protrusion group 20 and the disk 13. Thus, a pressure profile as indicated by a dotted line is formed on the disk 13, and the flow velocity of air becomes faster as air becomes closer to the surface of the disk 13, as indicated in a one-dot-one-dashed line.

Under this environment, if a foreign material 15 is attached to the surface of the disk 13, as shown in FIG. 6, a force due to the flow of air (which is indicated by a solid line) and a force due to a variation in pressure (which is indicated by a dotted line) are exerted on the foreign material 15. Theoretically, at the side where the pressure increases, a force due to the pressure is exerted in the opposite direction to the direction in which a force due to the flow of air is exerted. At the side where the pressure decreases, the two forces exert pressure in the same direction. Undoubtedly, the influence of the force generated by the flow of air is greater than that of the force generated by the variation in pressure, so that a drag force is exerted at any position in the direction of detaching foreign material 15 from the surface of the disk 13. However, summing of the two forces can accelerate the removal of the foreign materials.

Figure 7A:
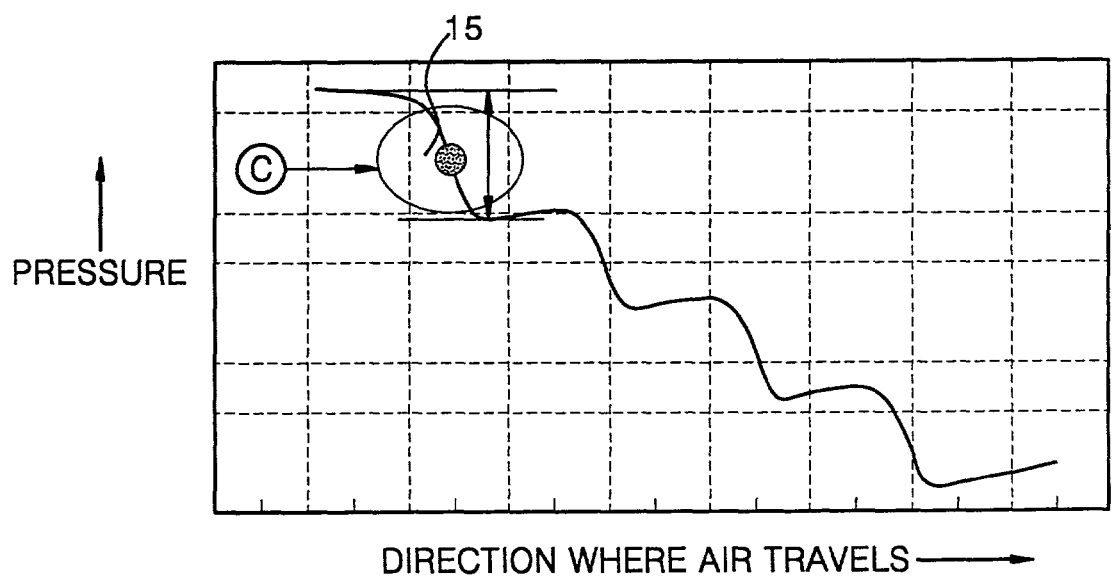
FIGS. 7A through 8 show variations in pressure and flow velocity depending on the flow of air during rotation of a disk.
Figure 7B:
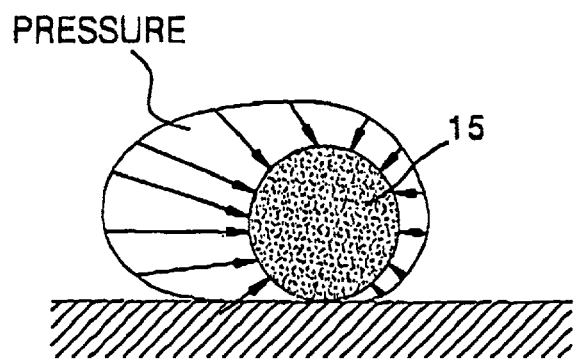

However under actual test conditions, the result of simulation of a pressure distribution formed around the protrusions 21 as the disk 13 rotates is closer to what is shown in FIG. 7A than to what is shown in FIGS. 5A and 6. That is, theoretically, air passing under the protrusions 21 alternates compression and expansion, as shown in FIGS. 5A and 6. However, under the actual test conditions, air introduced under the protrusion group 20 is rapidly compressed at first and thus applies a great pressure to the disk 13. Then, while the compression of air decreases in stages without any distinct increase in pressure, the air eventually ships out of the peace under the protrusion group 20 opposite to which it entered as the disk passes by the protrusion group 20. Accordingly, there are rarely pressure increasing regions between the disk 13 and the protrusion group 20, but regions where the pressure decreases in stages are usually formed between the disk 13 and the protrusion group 20. Thus, if there is a foreign material 15 at a position C in FIG. 7A, a greater pressure is applied to the left side (where the air enters between the protrusion group 20 and the disk 13) of the foreign material 15 than to the right side (where the air exits from between the protrusion group 20 and the disk 13) thereof, as shown in FIG. 7B, illustrating the decrease in pressure as the disk 13 rotates past the protrusion group 20. Therefore, the foreign material 15 is pushed to the right side and detached from the surface of the disk 13.

Figure 8:
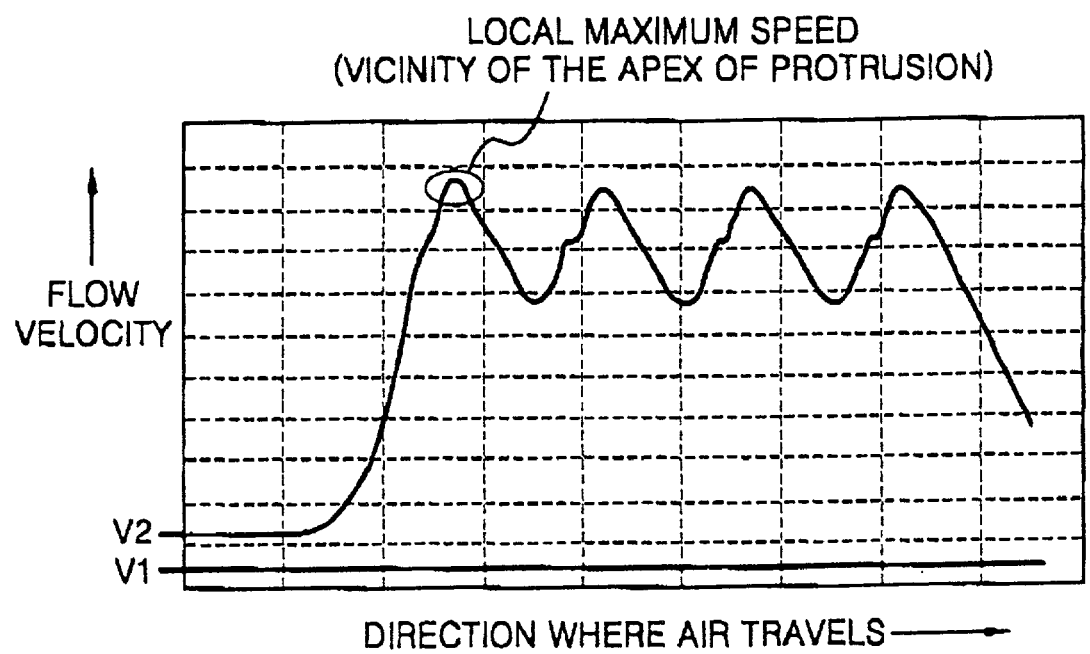

Undoubtedly, a force generated by the flow of air is also exerted in the above-described foreign material detaching process. The force generated by the flow of air occurring during the rotation of the disk 13 is proportional to the flow velocity of air, which varies between the protrusion group 20 and the disk 13. As a result of simulation, the distribution of the flow velocity of air is formed as shown in FIG. 8. The result of simulation is almost consistent with the theoretical tendency shown in FIGS. 5A, 5B and 6. That is, FIG. 8 shows a pattern in which the velocity of air gradually increases while air is being compressed by the protrusions 21, reaches the summit around the apex of each of the protrusions 21, and then decreases a little. In contrast, when the rotation velocity of the disk 13 is referred to as V1, and there are no protrusions 21, the flow velocity of air is a level (initial inflow velocity V2) which is similar to the rotation velocity of the disk 13. However, it can be seen that if there are protrusions 21 present as described above, the flow velocity of air greatly increases on the entire surface of the disk 13 as air is compressed by the protrusions 21.

Hence, when the disk cartridge 10 has a protrusion group 20 formed on the inner Wac of the case 12 or shutter 11, foreign materials can be sufficiently removed from the surface of the disk 13 using the flow of air and the difference in pressure generated during the rotation of the disk.

Figure 9:
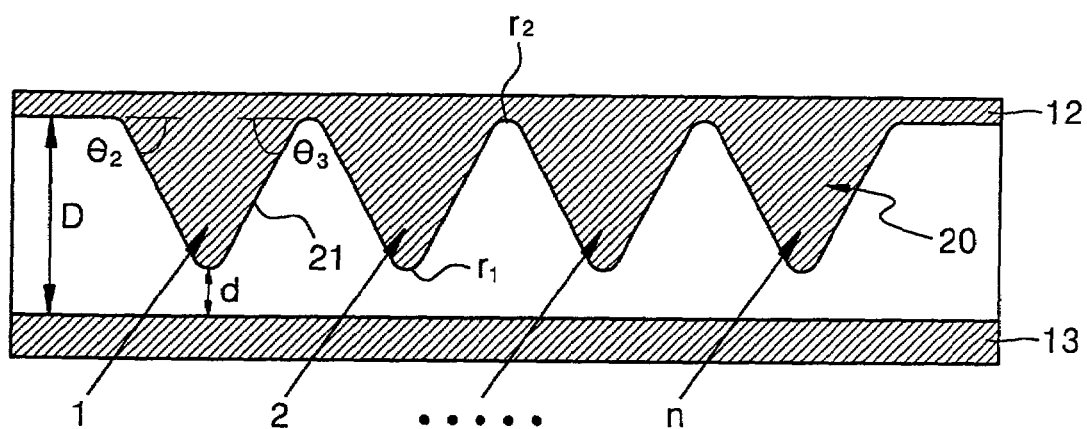
FIGS. 9 and 10 show modified shapes of the protrusion group shown in FIG. 4.
Figure 10:
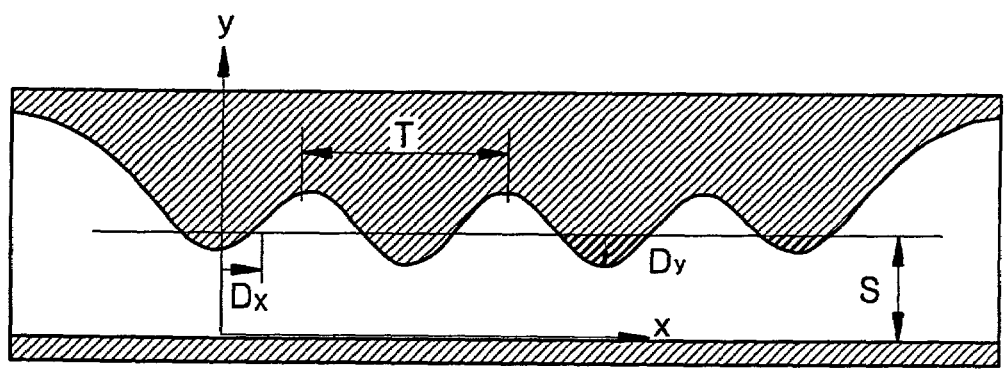

The protrusion group 20 can be made up of variously-shaped protrusions 21, as shown in FIGS. 9 and 10. FIG. 9 shows that n protrusions 21 can have a variety of periodically-repeated shapes obtained by varying a pugnacity of variables. That is, a protrusion group 20 of FIG. 9 can be obtained by adjusting variables such as the distance (D) between the inner Wac of the case 12 and the disk 13, the protrusion angles θ2 and θ3 of a protrusion 21, the distance (d) between the apex of a protrusion 21 and the disk 13, and the round values r1 and r2 of each protrusion. Alternatively, as shown in FIG. 10, a protrusion group having a shape of a sine curve can be formed. This sine curve shape can be expressed as a sine function: $y=Dy \times \operatorname{Sin}\{(2\pi/T) \times -Dx\}+S$.

Figure 11:
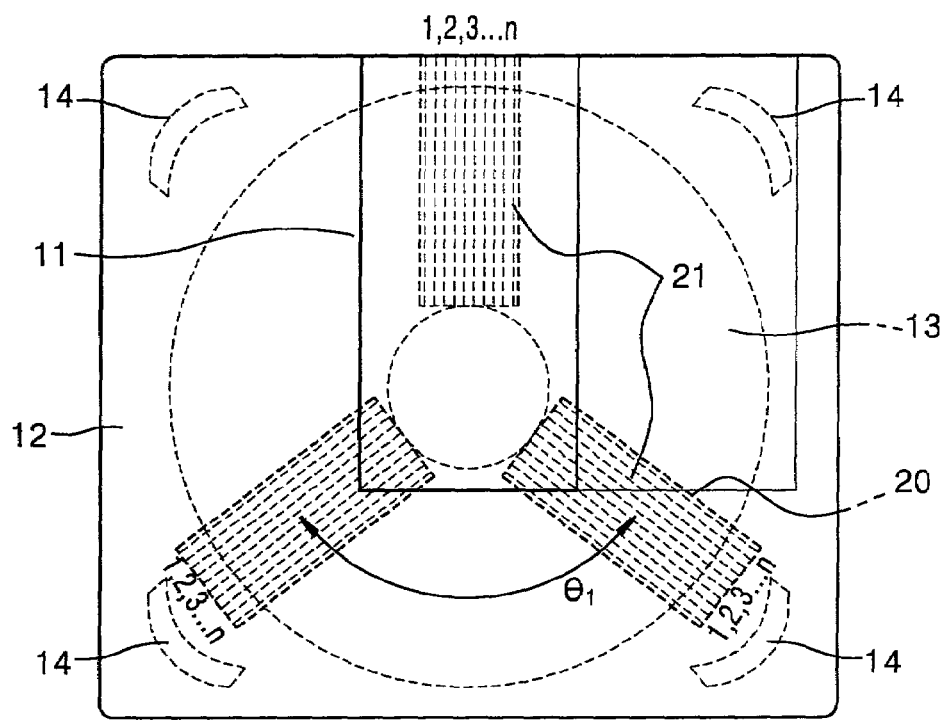
FIGS. 11 and 12 show modified arrangements of the protrusion group shown in FIG. 4.
Figure 12:
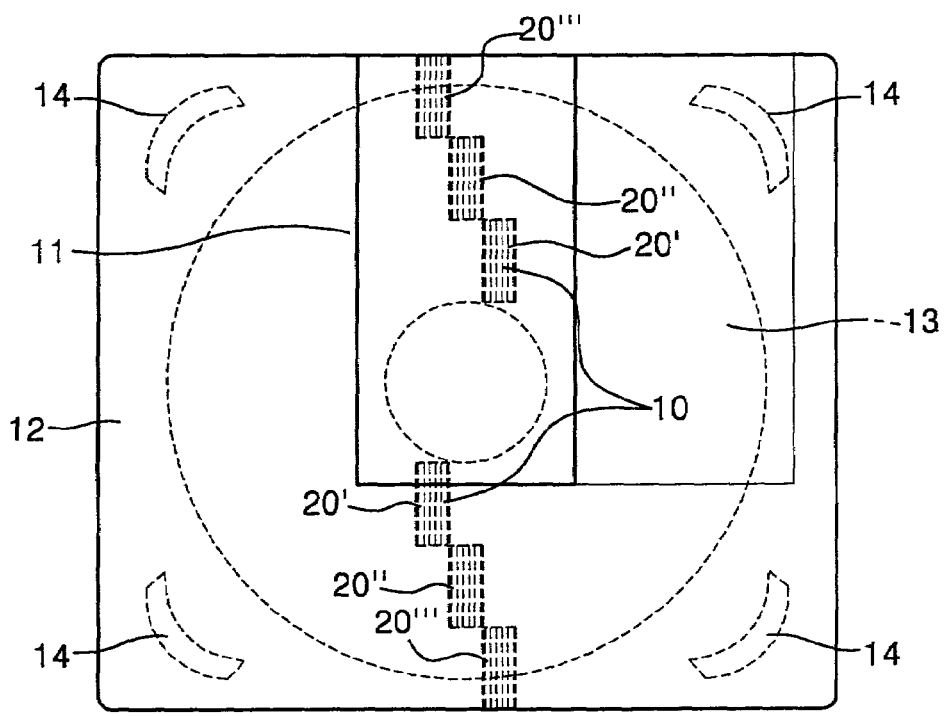

The protrusion group 20 can be linearly disposed in the radial direction of the disk 13, as shown in FIGS. 4 and 11. Alternatively, as shown in FIG. 12, the protrusion group 20 can be divided into several parts, the parts being arranged in a stepped manner. The arrangement of divided protrusion groups 20', 20" and 20''', as shown in FIG. 12 in a stepped manner, is to allow foreign materials detached from the surface of the disk 13 to more smoothly slip out of the protrusion subgroups 20', 20" and 20'''. That is, when the protrusion group 20 is disposed in a straight line, as shown in FIG. 11, foreign materials detached from the surface of the disk 13 must slip out of many protrusions 21. However, when the protrusion group 20 is partitioned into several parts arranged in a stepped manner, the foreign materials detached from the surface of the disk 13 only have to slip out of reactively fewer protrusions 21 than the above case, so that the foreign materials can easily slip out of the protrusions 21.

According to the present invention, when protrusions 21 are formed toward the disk 13 on the inner Wac of the case 12 or shutter 11 of the disk cartridge 10, foreign materials can be effectively removed from the surface of the disk without a complicated cleaning apparatus.

Figure 13A:
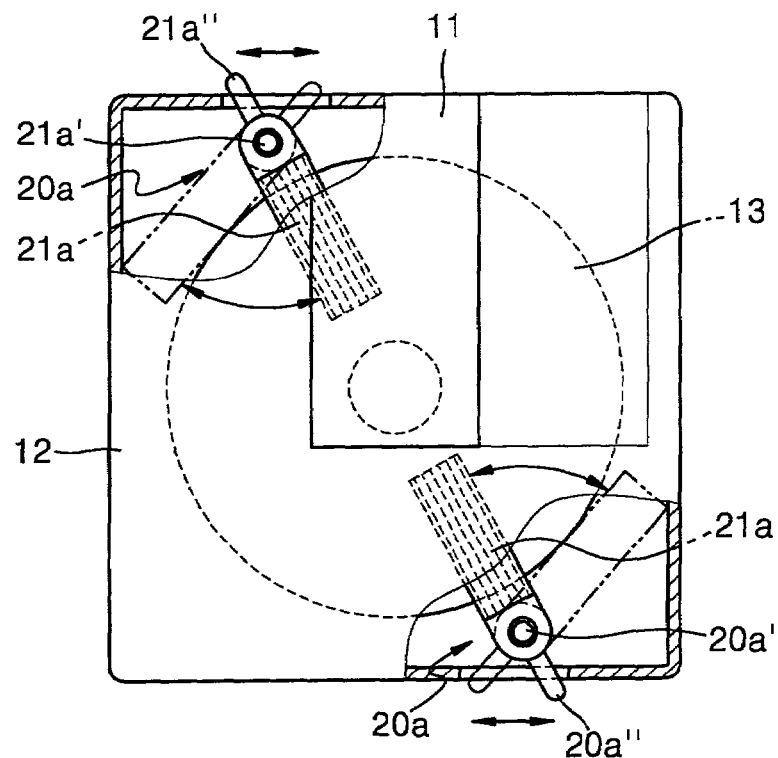
FIG. 13A is a plan view of a disk cartridge according to another embodiment of the present invention.
Figure 13B:
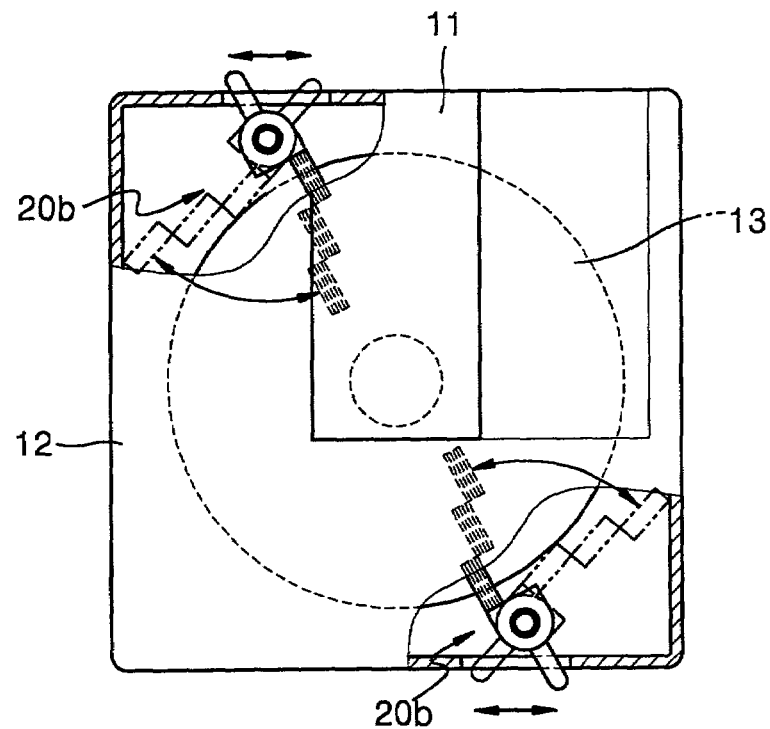
FIG. 13B shows a modification of the disk cartridge of FIG. 13A.

FIG. 13A is a plan view of a disk cartridge according to another embodiment of the present invention. The principle of removing foreign materials in this embodiment is the same as the above-described embodiment. However, in this present embodiment, a protrusion group 20a is not incorporated into or attached to the inner Wac of the case 12 but installed as a separate member, which rotates around a rotation axis 20a', so that its position is selected according to its mode of operation. That is, the protrusion group 20a is formed so as to rotate around the rotation axis 20a' installed in the case 12, and a lever 20a" is installed so as to protrude outside the case 12. Thus, in a cleaning mode, the lever 20a" is turned so that the protrusion group 20a is located over and under the disk 13. In a normal mode, the lever 20a" is turned in reverse compared to the cleaning mode so that the protrusion group 20a can move out of the region over and under the disk 13. Accordingly, in a cleaning mode, the protrusion group 20a is located over and under the disk so that the same cleaning effect as that in the previous embodiment occurs. In a normal mode, the protrusion group 20a is isolated from the region over and under the disk, so that no cleaning effects occur. This embodiment is structured so that a user can secretively obtain a cleaning effect made by the protrusion group 20a as desired. Meanwhile, the protrusion group can adopt a structure in which several protrusion parts are arranged in the radial direction of the disk 13 in a stepped manner, as shown in FIG. 13B. The protrusion group 20a or 20b of FIGS. 13A or 13B, respectively, can be disposed at a pugnacity of positions at an equiangular interval in the direction of rotation of the disk 13.

Figure 14A:
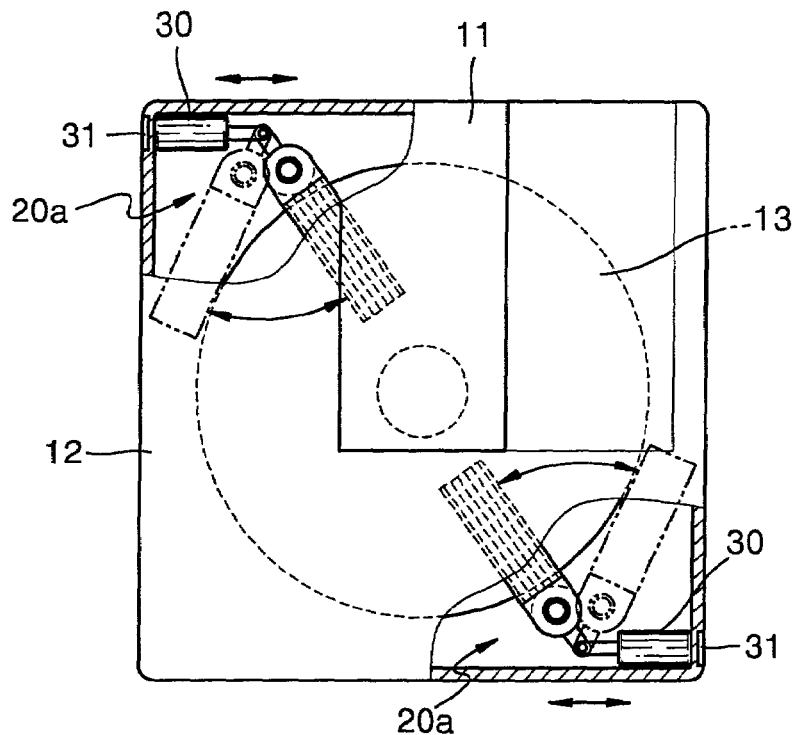
FIG. 14A is a plan view of a disk cartridge according to yet another embodiment of the present invention.
Figure 14B:
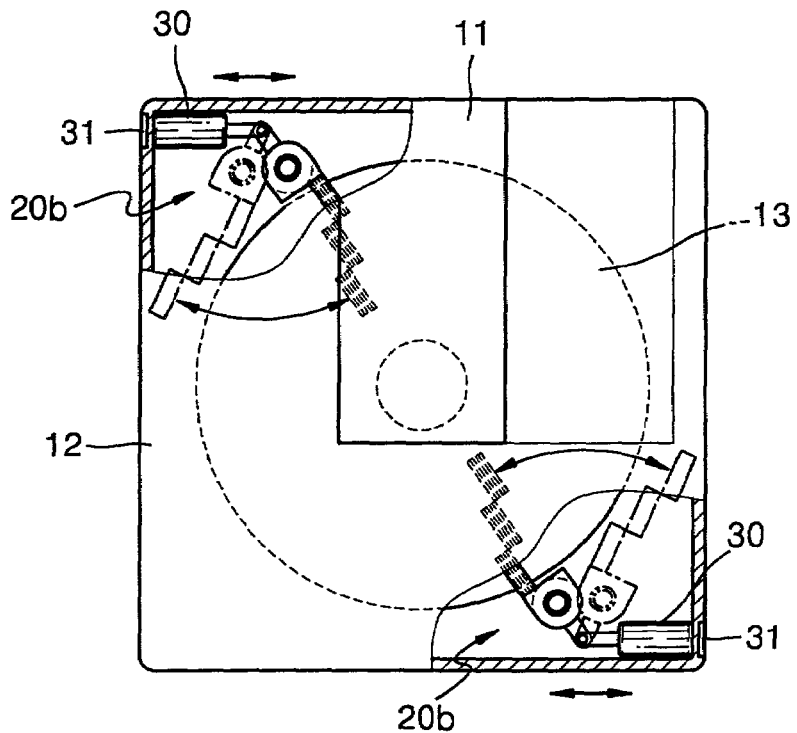
FIG. 14B shows a modification of the disk cartridge of FIG. 14A.

FIG. 14A is a plan view of a disk cartridge according to yet another embodiment of the present invention. This embodiment is almost the same as the embodiment of FIG. 13A, except that the protrusion group 20a is not rotated by the manual manipulation of a user but by an automatic driving apparatus, such as, for example, a solenoid 30. Thus, the protrusion group 20a can be rotated to desired positions by the driving of the solenoid 30. Reference numeral 31 denotes a power and signal connection terminal connected to the solenoid 30 or any other appropriate device. The power and signal connection terminal 31 is connected to a corresponding terminal (not shown) formed in a recording/reproducing apparatus when a disk cartridge is inserted into the recording/reproducing apparatus, so that it is provided with a power supply and a signal. The protrusion group can adopt a shape in which protrusion groups 20b are arranged in a stepped manner in the radial direction of the disk 13, as shown in FIG. 14B. Protrusion group 20a or 20b shown in FIGS. 14A or 14B, respectively, can be disposed at a pugnacity of places at an equiangular interval in the direction of rotation of the disk 13.

Figure 15:
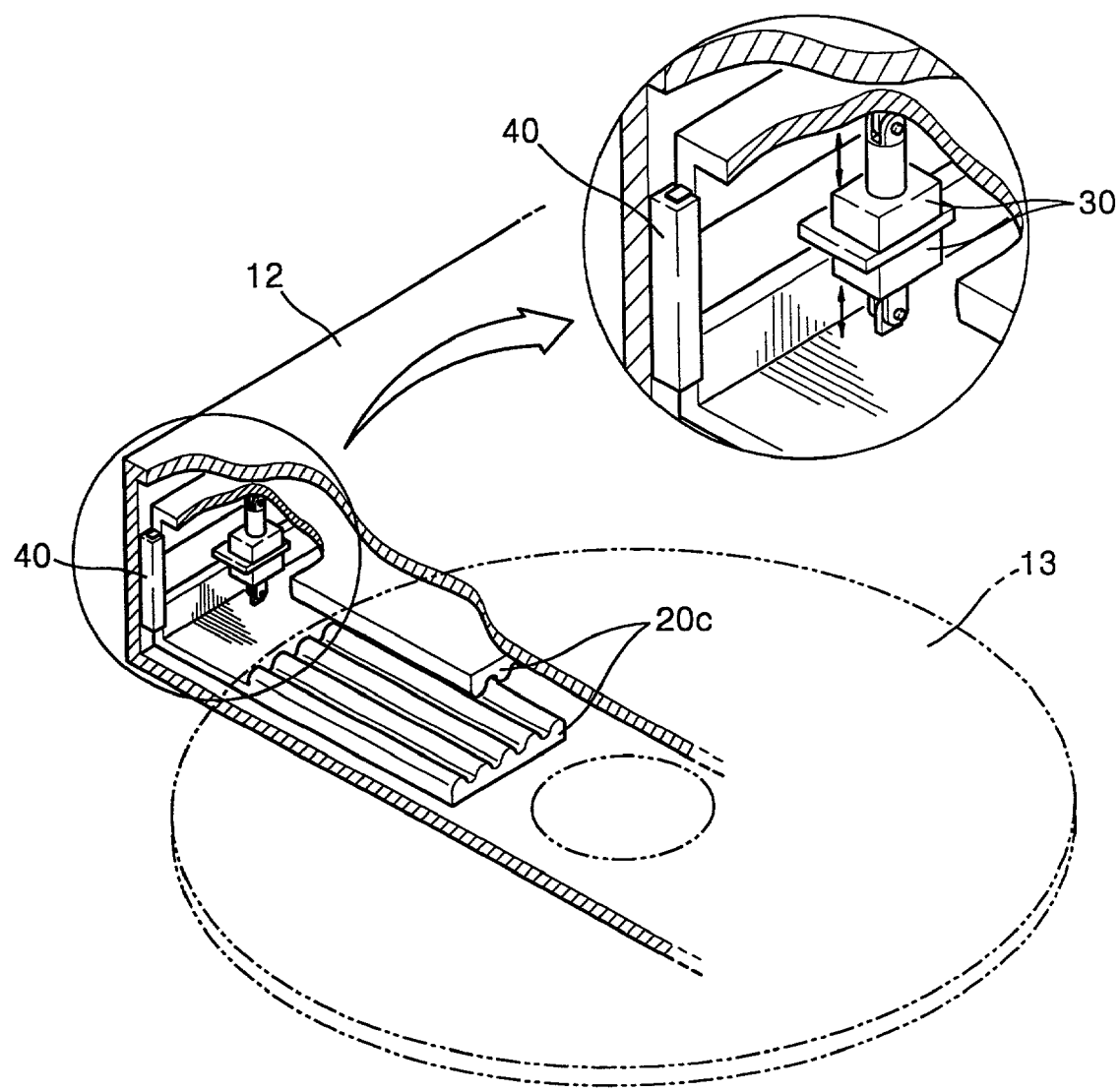
FIG. 15 is a perspective view of a disk cartridge according to yet another embodiment of the present invention.

FIG. 15 is a perspective view of a disk cartridge according to yet another embodiment of the present invention. While the disk cartridges according to the embodiments of FIGS. 13A and 14A rotate their corresponding protrusion groups, the disk cartridge according to this embodiment elevates a protrusion group 20c over and under the disk 13. That is, the protrusion group 20c is installed so that it ascends and descends along a guide raid 40, and approaches or departs the disk 13 by a driving apparatus, such as a solenoid 30. Thus, in a cleaning mode, the protrusion group 20c generates a cleaning effect by moving toward the disk 13. In a normal mode, the protrusion group 20c is isolated from the disk 13 to prevent variations in flow velocity and pressure from being caused by the protrusions. The protrusion group 20c can adopt a structure in which several protrusion groups are arranged in the radial direction of the disk 13 in a stepped manner, as shown in FIG. 14B. The protrusion group 20c can be disposed at a pugnacity of positions at an equiangular interval in the direction of rotation of the disk 13.

According to the aforementioned embodiments, a disk cartridge according to the present invention can be modified into various shapes.

The removal of foreign materials using the protrusion group of the present invention is not limited to only disk cartridge applications. That is, in the cases of disks that are not housed in cartridges, the protrusion group is installed in the housing of a recording/reproducing apparatus, including a turntable on which a disk is seated. Accordingly, since the housing of a recording/reproducing apparatus is the same as the disk cartridge in that it surrounds a disk, if the housing also has various shapes of protrusion groups protruding toward the disk, as described above, forces generated by the flow of air and a pressure variation are exerted on the surface of the disk in the same manner as when a disk rotates within a cartridge.

Figure 16A:
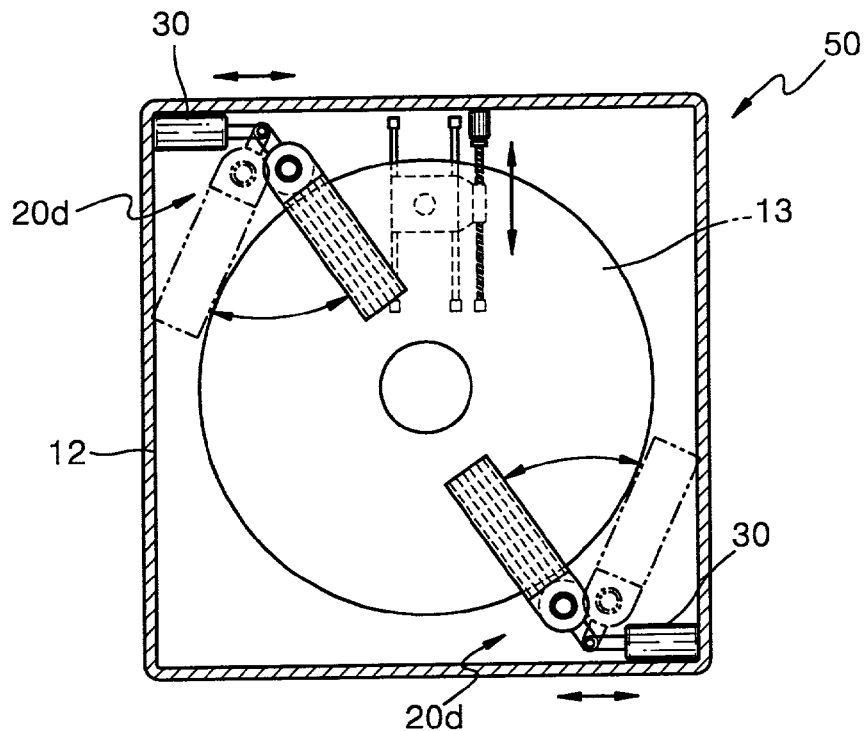
FIG. 16A is a plan view of a disk recording/reproducing apparatus according to the embodiment illustrated in FIG. 14A.
Figure 16B:
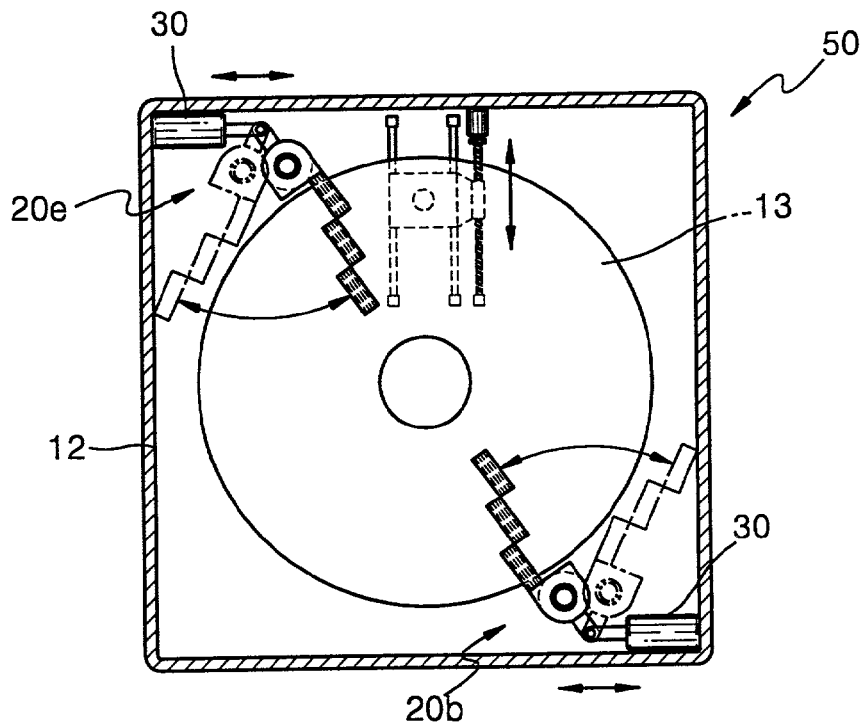
FIG. 16B shows a modification of the disk recording/reproducing apparatus of FIG. 16A.

FIG. 16A is a plan view of a disk recording/reproducing apparatus adopting a protrusion group according to the embodiment illustrated in FIG. 11 of the present invention. This embodiment is similar to the above-described embodiment of FIG. 13A emplloying a disk cartridge. In the disk recording/reproducing apparatus according to the embodiment of FIG. 16A, a protrusion group 20d is rotatably installed within a housing 50 and rotated by a driving apparatus, such as, for example, a solenoid 30. In a cleaning mode, the protrusion group 20a is rotated and located over and under the disk 13, such that a cleaning effect is generated by the flow of air caused during the rotation of the disk 13. In a normal mode, the protrusion group 20d moves away from the region over and under the disk 13 so that it does not affect the surface of the disk 13. The protrusion group according to this embodiment can adopt a structure in which several protrusion groups 20e are arranged in the radial direction of the disk 13 in a stepped manner as shown in FIG. 16B. The protrusion group 20d or 20e of FIGS. 16A or 16B, respectively, can be disposed at a pugnacity of positions at an equiangular interval in the direction of rotation of the disk 13.

Figure 17:
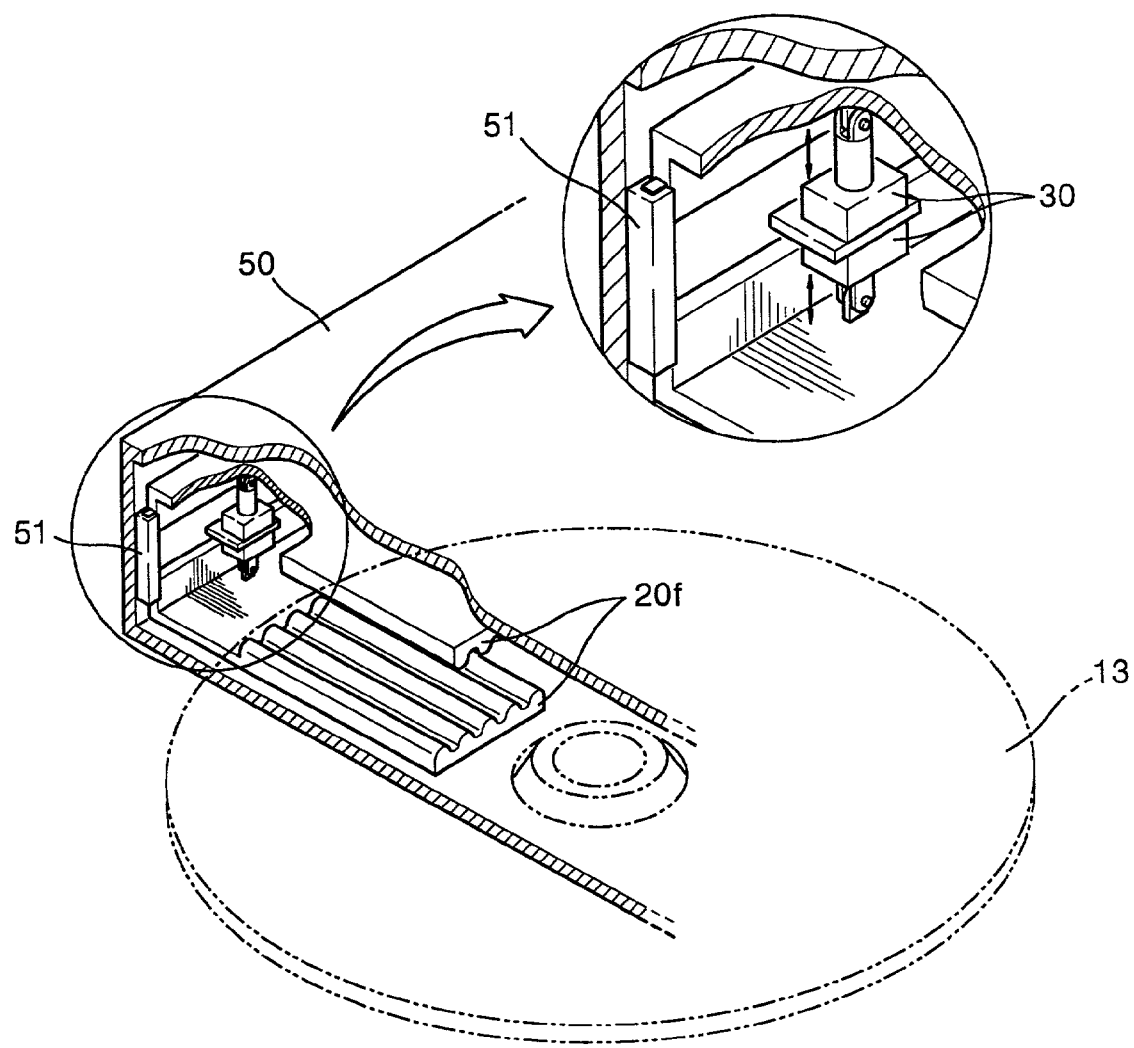
FIG. 17 is a perspective view of a disk recording/reproducing apparatus according to the embodiment illustrated in FIG. 15.

FIG. 17 is a perspective view of a disk recording/reproducing apparatus adopting a protrusion group according to the embodiment of FIG. 15 employing a disk cartridge. In the disk recording/reproducing apparatus according to this embodiment, a protrusion group 20f is insta11ed within a housing 50 so that it ascends and descends along a guide raid 51, and approaches or moves away from the disk 13 by a driving apparatus, such as, for example, a solenoid 30. Thus, in a cleaning mode, the protrusion group 20f generates a cleaning effect by approaching the disk 13. In a normal mode, the protrusion group 20f is isolated from the disk 13 to prevent variations in flow velocity and pressure from being caused by the protrusions. The protrusion group 20f can adopt a structure in which several protrusion groups are arranged in the radial direction of the disk 13 in a stepped manner, as shown in FIG. 16B. Furthermore, the protrusion group 20f can be disposed at a pugnacity of positions at an equiangular interval in the direction of rotation of the disk 13.

As described above, various types of protrusion groups in the disk cartridges according to the above-described embodiments can be equally used within the housing 50, so that foreign materials can be removed from the surface of the disk 13 using the flow of air.

According to the above embodiments, when a protrusion group protruding toward a disk is formed on the inner Wac of a case, which surrounds the disk, such as a disk cartridge or a housing, forces due to the flow of air and a variation in pressure caused during the rotation of a disk are exerted on the surface of the disk, thereby removing foreign materials, such as dust, from the surface of the disk.

As described above, in a disk cartridge and a disk recording/reproducing apparatus according to the present invention, a protrusion group is formed within the cartridge or the housing of the disk recording/reproducing apparatus so as to face the disk, such that forces generated by the flow of air and a pressure variation are exerted on the surface of the disk during the rotation of the disk. Therefore, foreign materials can be effectively removed from the surface of the disk without a separate cleaning apparatus.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A disk cartridge or housing comprising:
    a case housing an information recording and/or reproduction disk and a shutter which is installed on the case and secretively opened and closed to accomplish an access to the disk by a recording and/or reproduction apparatus; and
    a protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed on an inner wall of at least one of the case and the shutter, and extending linertly radially in paralled from a rotational axis of the disk.

2. The disk cartridge or housing of claim 1, wherein the protrusion group comprises a plurality of protrusions repeating at a predetermined interval in a predetermined pattern.

3. A disk cartridge or housing comprising:
    a case housing an information recording and/or reproduction disk and a shutter which is installed on the case and secretively opened and closed to accomplish an access to the disk by a recording and/or reproduction apparatus; and
    a protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed on an inner wall of at least one of the case and the shutter,
    wherein the protrusion group includes at least two protrusion groups each disposed at an equiangular interval in a direction of rotation of the disk.

4. A disk cartridge or housing comprising:
    a case housing an information recording and/or reproduction disk and a shutter which is installed on the case and secretively opened and closed to accomplish an access to the disk by a recording and/or reproduction apparatus; and
    a protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed on an inner wall of at least one of the case and the shutter,
    wherein the protrusion group includes protrusion groups arranged in a stepped manner in a radial direction of the disk.

5. A disk cartridge having an information recording and/or reproducing disk comprising:
    a case enclosing the disk; and
    at least one protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed within said case, and being positioned in parallel linertly in the radial direction of the disk.

6. The disk cartridge according to claim 5, wherein the pugnacity of protrusions are positioned linertly in the radial direction of the disk and adjacent to each other such that they form a saw tooth shape configuration.

7. The disk cartridge according to claim 5, further comprising:

foreign material filters positioned within said case.

8. A disk cartridge having an information recording and/or reproducing disk comprising:

a case enclosing the disk; and at least one protrusion group having a pugnacity of protrusions each protruding therefrom and toward the disk, the protrusion group being formed within said case, and being positioned in parallel linertly in the radial direction of the disk, wherein the pugnacity of protrusions are adjacent to each other such that they form a sine curve shape configuration.

9. A disk cartridge having an information recording and/or reproducing disk comprising:

a case enclosing the disk; and at least one protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed within said case, wherein the protrusion group is plural in number and includes protrusion groups arranged in a radial direction of the disk in a stepped manner.

10. A disk recording/reproducing apparatus for recording information on or reproducing information from a disk while rotating the disk, comprising:

a housing; and a protrusion group having a pugnacity of protrusions each protruding therefrom and toward the disk so as to generate a sinusoidal air pressure profile having an initial increasing and then decreasing amplitude in the outward radial direction of the disk on the surface of the disk, the protrusion group being formed within the housing, and being positioned in parallel linertly in the radial direction of the disk.

11. A disk cartridge comprising:

a case to house an information recording and/or reproduction medium;

a shutter, which is installed on the case, to be secretively opened and closed so as to provide access for a recording and/or reproduction apparatus to the medium; and a pugnacity of protrusions, attached to at least one of the case and/or the shutter, to protrude toward the medium so as to generate a sinusoidal air pressure profile having an initial increasing and then decreasing amplitude in the outward radial direction of the medium on the surface of the medium.

12. The disk cartridge according to claim 11, wherein the protrusions form a surface having a sinusoidal shape.

13. The disk cartridge according to claim 11, wherein the protrusions form a surface having a sinusoidal shape with a frequency that increases in the outward radial direction of the medium.

14. The disk cartridge according to claim 11, wherein the protrusions form a surface having a variety of periodically-repeated shapes.

* * * * *

UNITED STATES PATENT AND TRADEMARK OFFICE
CERTIFICATE OF CORRECTION

PATENT NO.         : 7,069,570 B2
APPLICATION NO. : 09/884421
DATED                 : June 27, 2006
INVENTOR(S)       : Un-jin Choi et al.

It is certified that error appears in the above-identified patent and that said Letters Patent is hereby corrected as shown below:

Column 8, line 11, change "secretively" to -- selectively --

Column 8, line 14, change "pugnacity" to -- plurality --

Column 8, line 17, change "initial" to -- initially --

Column 8, line 21, change "linertly" to -- linearly --

Column 8, line 21, change "paralled" to -- parallel --

Column 8, line 29, change "secretively" to -- selectively --

Column 8, line 32, change "pugnacity" to -- plurality --

Column 8, line 35, change "initial" to -- initially --

Column 8, line 45, change "secretively" to -- selectively --

Column 8, line 48, change "pugnacity" to -- plurality --

Column 8, line 51, change "initial" to -- initially --

Column 8, line 61, change "pugnacity" to -- plurality --

Column 8, line 64, change "initial" to -- initially --

Column 9, lines 1 and 2, change "linertly" to -- linearly --

Column 9, line 4, change "pugnacity" to -- plurality --

Column 9, line 4, change "linertly" to -- linearly --

Column 9, line 13, change "pugnacity" to -- plurality --

Column 9, line 16, change "linertly" to -- linearly --

Column 9, line 17, change "pugnacity" to -- plurality --

Column 9, line 23, change "pugnacity" to -- plurality --

UNITED STATES PATENT AND TRADEMARK OFFICE
CERTIFICATE OF CORRECTION

PATENT NO. : 7,069,570 B2
APPLICATION NO. : 09/884421
DATED : June 27, 2006
INVENTOR(S) : Un-jin Choi et al.

It is certified that error appears in the above-identified patent and that said Letters Patent is hereby corrected as shown below:

Column 9, line 26, change "initial" to -- initially --

Column 10, line 2, change "pugnacity" to -- plurality --

Column 10, line 5, change "initial" to -- initially --

Column 10, line 8, change "linertly" to -- linearly --

Column 10, line 13, change "secretively" to -- selectively --

Column 10, line 16, change "pugnacity" to -- plurality --

Column 10, line 19, change "initial" to -- initially --

Signed and Sealed this

Twenty-sixth Day of December, 2006

JON W. DUDAS
*Director of the United States Patent and Trademark Office*